United States Patent [19]
Beshke et al.

[11] Patent Number: 4,629,384
[45] Date of Patent: Dec. 16, 1986

[54] TRANSFER AND LOCATOR OF WORKPIECES FOR A GANG MACHINE

[75] Inventors: James G. Beshke, Birmingham; Mark C. Tomlinson, Warren, both of Mich.

[73] Assignee: Lamb Technicon Corp., Warren, Mich.

[21] Appl. No.: 790,233

[22] Filed: Oct. 22, 1985

[51] Int. Cl.⁴ .............................................. B23Q 7/00
[52] U.S. Cl. .................................. 414/222; 269/309; 408/42; 408/52
[58] Field of Search ............................. 414/222–225, 414/590, 786; 408/62, 63, 70, 42, 49, 50, 52; 409/225, 227; 269/309, 310, 233, 234

[56] References Cited
U.S. PATENT DOCUMENTS

| | | | |
|---|---|---|---|
| 3,240,084 | 3/1966 | Palmer | 408/52 X |
| 4,179,230 | 12/1979 | Kitagawa | 408/52 X |
| 4,253,559 | 3/1981 | Myers et al. | 414/222 X |
| 4,278,380 | 7/1981 | Guarino | 414/222 X |
| 4,373,840 | 2/1983 | Miller, Jr. | 414/786 X |
| 4,543,970 | 10/1985 | Noh et al. | 269/309 X |

Primary Examiner—Terrance L. Siemens
Attorney, Agent, or Firm—Barnes, Kisselle, Raisch, Choate, Whittemore & Hulbert

[57] ABSTRACT

An apparatus for transferring a pallet with a plurality of workpieces into a gang machine and locating and clamping the workpieces while being machined. The workpieces are received and loosely retained on the pallet while being transferred and each workpiece is located and clamped in the machine independently of both the other workpieces and the pallet. Each workpiece is accurately positioned by locators carried by the machine and at least in part held while being machined by clamps carried by the pallet. The workpieces are moved into engagement with the locators by a lift which moves the pallet toward the locators.

14 Claims, 9 Drawing Figures

TRANSFER AND LOCATOR OF WORKPIECES FOR A GANG MACHINE

FIELD OF THE INVENTION

This invention relates to the transfer and location of workpieces for machining and, more particularly, to an apparatus for transferring and locating a plurality of workpieces in a gang machine which performs substantially the same machining operation on each of a plurality of workpieces at the same time.

BACKGROUND OF THE INVENTION

In gang machines which perform substantially the same machining operation on each of a plurality of workpieces at the same time, it has been the usual practice to locate and manually clamp the plurality of workpieces on a pallet. The pallet with the workpieces on it is then transferred into the gang machine while substantially the same machining operation such as drilling a hole is performed on all the workpieces on the pallet.

Pallets with a group of workpieces clamped on them are usually advanced through the gang machine by a transfer mechanism. When machining of each group of workpieces has been completed, the pallet is transferred out of the machine as the workpieces are unclamped and removed from the pallet, usually by hand. The pallet is then cleaned, reloaded with workpieces to be machined, and advanced by the transfer through the gang machine again.

Frequently the workpieces are loaded on the pallet and unloaded from the pallet mechanically by the use of robots or specially designed loaders. To locate and clamp the workpieces on the pallet with sufficient precision it is usually necessary to manually locate and hold the workpieces while they are clamped to the pallet.

Frequently, each pallet of workpieces is transferred through several gang machines, in each of which a machining operation is performed on all of the workpieces to produce finished workpieces. For example, to produce a threaded hole in each workpiece, the hole may be partially drilled in each of three gang drilling machines, the drilled hole reamed in a gang reaming machine and threads cut in the drilled and reamed hole by a gang tapping machine.

SUMMARY OF THE INVENTION

To more accurately locate workpieces for machining in a gang machine and to enable mechanical loading of the workpieces, a plurality of workpieces are loosely received by retainers on a pallet so that each workpiece can move with respect to the pallet in at least two directions at a right angle to each other. When the pallet is transferred into a gang machine, the workpieces are moved to engage at least one locator for each workpiece carried by the gang machine. Each workpiece is individually located in the machine independently of both the pallet and the other workpieces. Each workpiece is clamped by a clamping system preferably at least partially carried by the pallet and actuated by a drive, preferably carried by the machine. When the machining has been completed the workpieces are released and disengaged from the locators carried by the machine, preferably by strippers, and received on the pallet to be transferred from the gang machine.

Preferably the pallet is raised and lowered in the gang machine to engage and disengage the workpieces with the locators carried by the machine. Preferably the same drive actuates both the mechanism for raising and lowering the pallet and the clamps carried by the pallet.

Objects, features and advantages of this invention are to provide a transfer and locator apparatus for a gang machine which has substantially improved accuracy and precision in locating each workpiece to be machined; locates each workpiece independently of the other workpieces and the pallet on which they are transferred; enables mechanical loading of workpieces without adversely affecting the accuracy with which they are located and machined; and which is rugged, durable, reliable, relatively simple in design, economical in manufacture and assembly, requires relatively little service and maintenance and has a long useful life in service.

BRIEF DESCRIPTION OF THE DRAWINGS

These and other objects, features and advantages of this transfer and locator apparatus will be apparent from the following detailed description, appended claims and accompanying drawings, in which:

DETAILED DESCRIPTION

Figure 1:
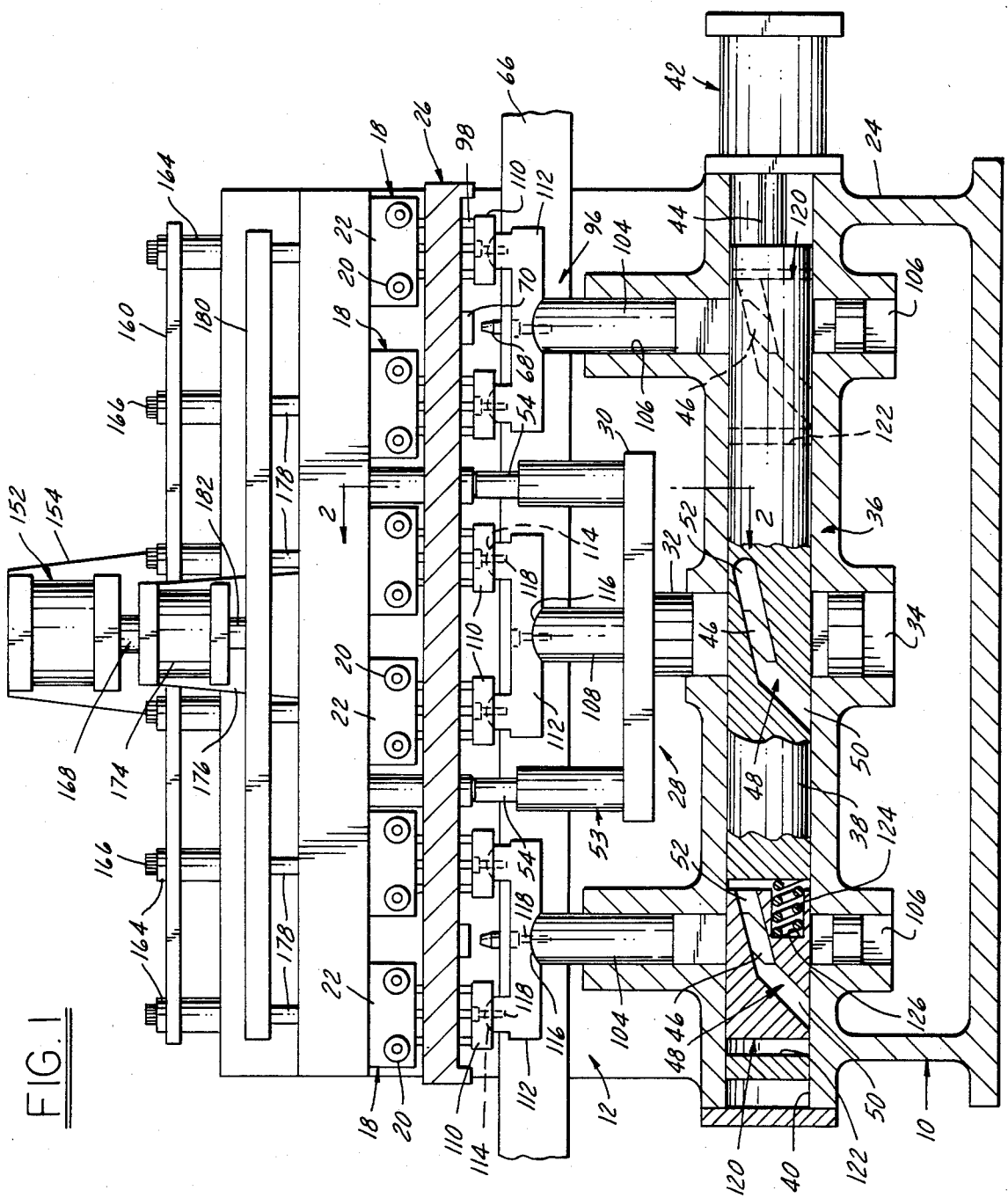
FIG. 1 is a side view with portions broken away of a gang drilling machine with a transfer and locator apparatus embodying this invention.
Figure 2:
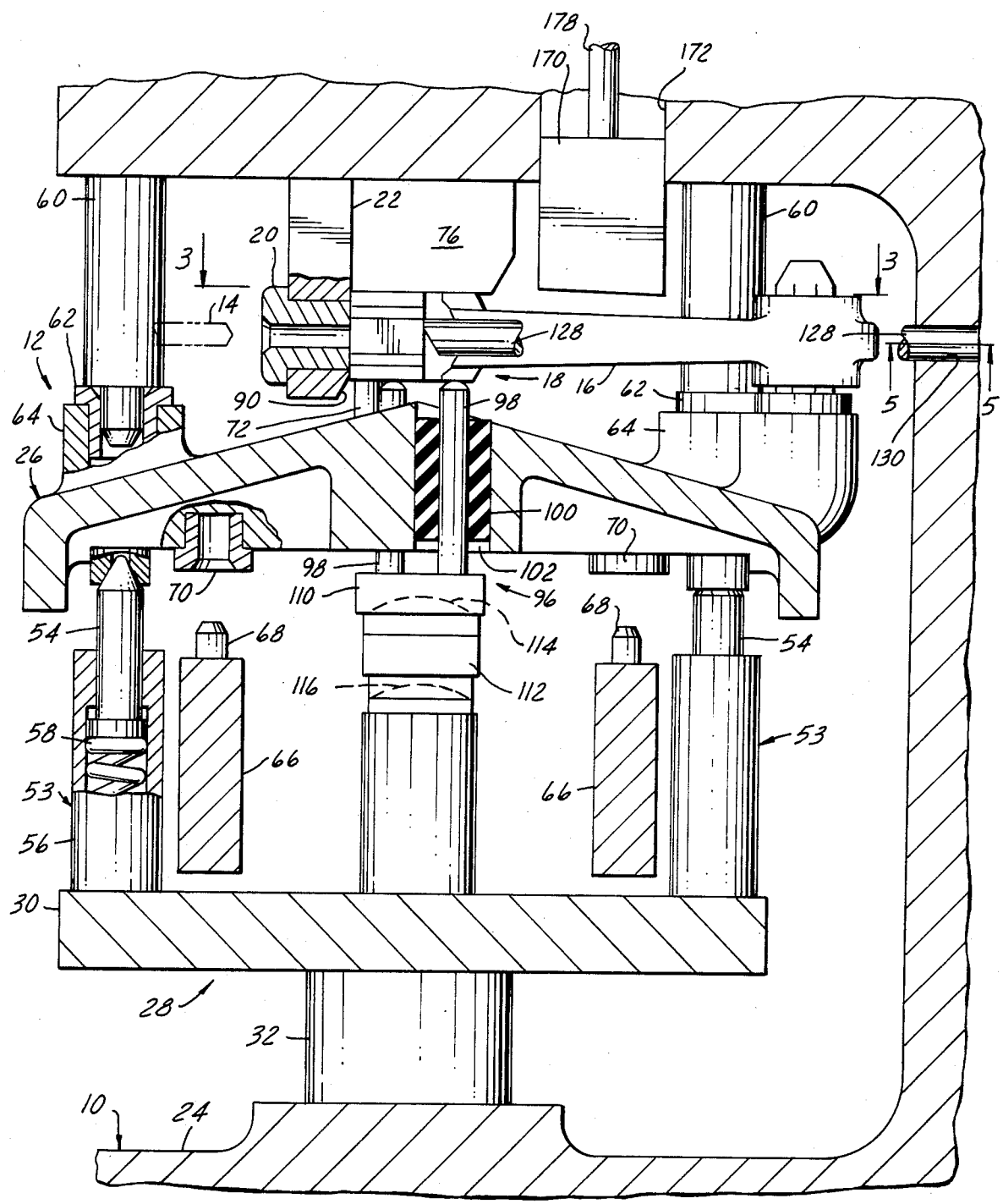
FIG. 2 is a fragmentary sectional view taken generally on line 2—2 of FIG. 1 showing some of the details of construction of the apparatus.
Figure 3:
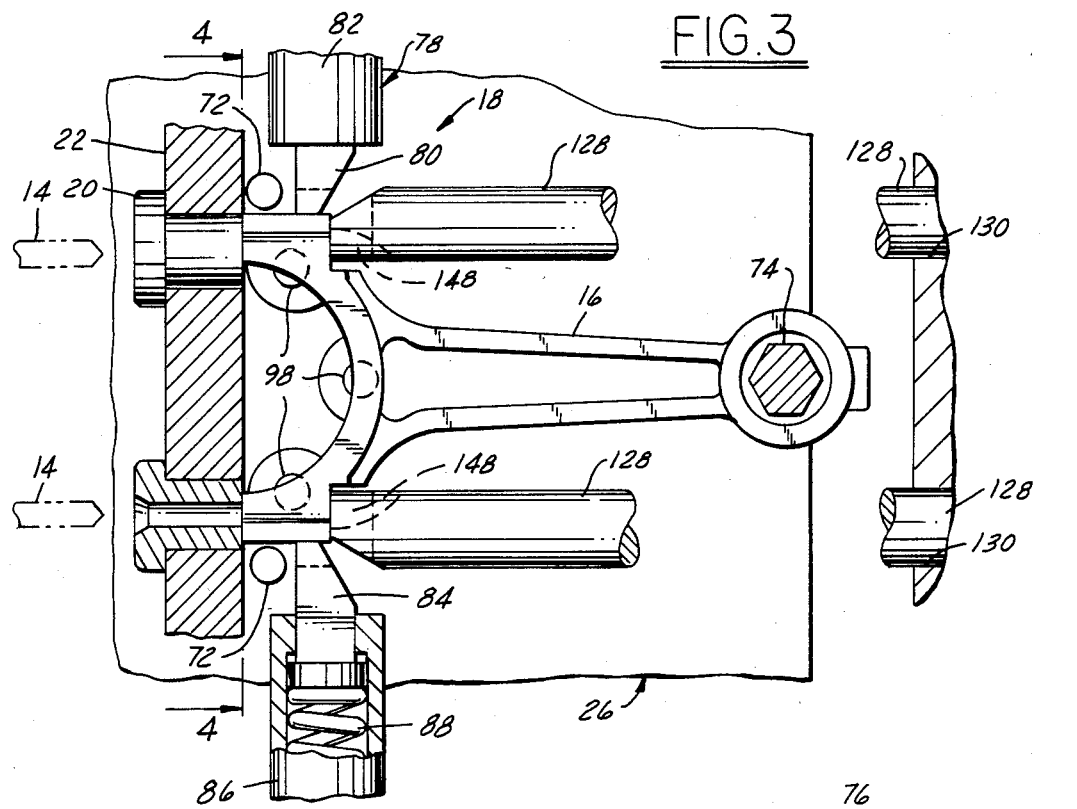
FIG. 3 is a fragmentary sectional view taken generally on line 3—3 of FIG. 2 showing some of the locators and clamps of the apparatus.
Figure 4:
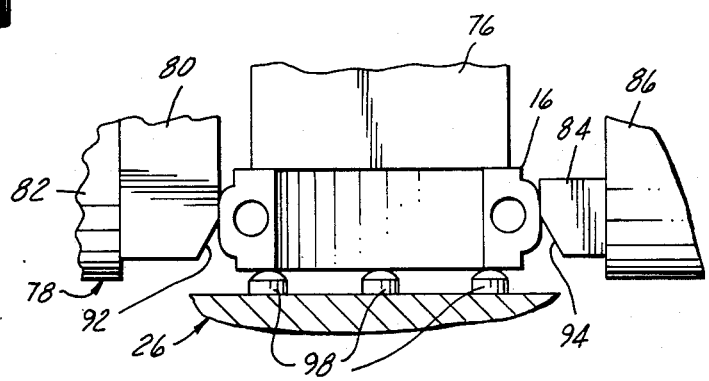
FIG. 4 is a fragmentary sectional view taken generally on line 4—4 of FIG. 3.

Referring in more detail to the drawings, FIGS. 1 and 2 illustrate a gang drilling machine 10 with a transfer and locator apparatus 12 embodying this invention. As shown in FIG. 3, holes are drilled by drills 14 in workpieces 16 which are connecting rods for internal combustion engines. The workpieces are located and clamped in each of six identical stations 18 in the machine. The drills in each station are advanced through guide bushings 20 received in a locator plate 22 secured to a C-shaped frame 24 of the machine.

The workpieces are carried by a pallet 26 which is raised and lowered in the machine by a lift assembly 28. The lift has an elevator plate 30 fixed to one end of a post 312 slideably received in a bore 34 in the frame. The lift is raised and lowered by a drive 36 with an actuator bar 38 slideably received in a bore 40 in the frame and driven by a hydraulic cylinder 42 mounted on the frame with its piston rod 44 connected to the actuator bar. The elevator plate is raised and lowered by a cam follower 46 connected to the post 32 and slideably received in a cam track 48 in the actuator bar. The track has a first section 50 providing a rapid traverse and a second section 52 providing a slower feed of the lift. The first track section 50 is inclined at a greater angle to the longitudinal axis of the actuating bar than is the second track section 52.

The pallet is positioned and supported on the lift by four spaced apart locator assemblies 53, each having a locator pin 54 slideably received in a housing 56 fixed to the elevator plate 30. Each locator pin 54 is yieldably biased to its extended position by a compression spring 58 received in a counterbore in the housing. So that these locator pins do not retract due to the combined weight of the pallet and the workpieces on it, the total force produced by all the springs 58 is greater than their combined weight.

When fully raised by lift assembly 28, the position of the pallet with respect to the work stations is determined by locator pins 60 fixed to the frame of the machine and slideably received in complementary bushings 62 received in sleeves 64 fixed to the pallet. These locator pins also provide positive stops limiting the vertically upwardly movement of the pallet. After upward movement of the pallet is stopped by the pins as the lift continues to rise, the springs 58 are compressed.

The pallets 26 are advanced into and out of the machine by a transfer mechanism having a pair of rails 66 which are intermittently reciprocated longitudinally by a drive (not shown). When received on the rails the pallets are positioned in spaced apart relationship by four locator pins 68 fixed to the rails and received in bushings 70 fixed to the underside of each pallet. When the lift 28 is fully lowered the pallet in the machine is deposited on the transfer rails and clears the lift sufficiently so that the pallet is transferred out of the machine, and another pallet is advanced into the machine, by movement of the rails to the right as viewed in FIG. 1. When the pallet in the machine is moved by the lift to the fully raised position, as shown in FIG. 2, it sufficiently clears the rails so they can be retracted by longitudinal movement to the left as viewed in FIG. 1 to return them to their starting position.

In accordance with this invention, the workpieces 16 are removably and loosely retained on and carried by the pallet so that, at least within predetermined limits, they can be shifted or moved slightly with respect to the pallet. Desirably, the workpieces can be moved along two axes at a right angle to each other and preferably moved along three axes which are orthogonal or at right angles to each other. As shown in FIG. 3, each workpiece is loosely retained on the pallet by two retainer pins 72 and a diamond retainer 74 mounted on the pallet. The retainer pin 72 are spaced apart sufficiently so that the crank shaft end of a connecting rod workpiece 16 is received between the pins with a slight clearance therebetween. The retainer pin 74 is received within the wrist pin bore of the connecting rod workpiece and has a smaller diameter than that of the bore so that there is a slight clearance between them.

In accordance with this invention and as shown in FIGS. 2 and 3, a workpiece is accurately positioned in each station of the machine by simultaneous engagement with an upper locator pad 76, a side locator 78 and the locator plate 22. Each plate 22 and pad 76 is fixedly mounted on the machine frame. The locator 78 has an abutment finger 80 secured in a housing 82 fixedly mounted on the machine frame. The workpiece is yieldably urged into engagement with the side locator 78 by a generally opposed movable finger 84 slideably received in a housing 86 fixedly mounted on the machine frame. The finger 84 is yieldably biased toward its extended position by a compression spring 88 received in a counterbore in the housing. To guide and facilitate insertion of the workpiece between the locators, the plate 22 has a beveled edge 90, the abutment finger 80 has a beveled edge 92 and the movable finger 84 has a beveled edge 94.

In accordance with another feature of this invention each workpiece is clamped in a station against the upper pad 76 by a clamp assembly 96 which preferably has a clamp pin 98 carried by the pallet. Each pin 98 is yieldably mounted in the pallet and biased by a resilient bushing 100 of rubber or plastic with an elastic memory received in a bore 102 through the pallet. Preferably, the bushing is bonded to both the pallet and the clamp pin.

Preferably, the clamp pins are actuated by a drive mechanism carried by the gang machine. Preferably the clamp pins are actuated by the same actuator bar and drive cylinder which powers the lift for the pallet. As shown in FIG. 1, the clamp pins for each outer pair of work stations are actuated by a clamp post 104 slideably received in a bore 106 in the frame. The clamp pins for the central pair of work stations are actuated by a clamp post 108 fixed to the plate 30 of the pallet lift for movement therewith.

As shown in FIGS. 1 and 2 the clamp pins for each pair of work stations are actuated by a pair of pressure pads 110 received on an equalizing bar 112 mounted on one of the clamp posts 104 or 108. To insure equalization of the force applied to each of the clamp pins, each pressure pad is mounted on an equalizing bar by a swivel or radius joint 114 and each equalizing bar is mounted on a clamp post by a swivel or radius joint 116. The pads, bars, and posts are retained in connected relationship by cap screws 118.

Each outer clamp post 104 is actuated by the bar 38 through a follower 46 connected to the post and slideably received in a cam track 48 with first and second sections 50, 52 in a block 120 slideably received in the bore 40 in the frame 24. To insure that all of the clamp pins will be actuated to securely clamp all the workpieces even though they may vary in thickness each block is connected to the actuator bar 38 by a lost motion coupling. To provide this coupling each block is also slideably received in an elongate clearance slot 122 in the actuator bar 38 and is yieldably biased by a compression spring 124 received in a blind hole 126 in the block.

Figure 5:
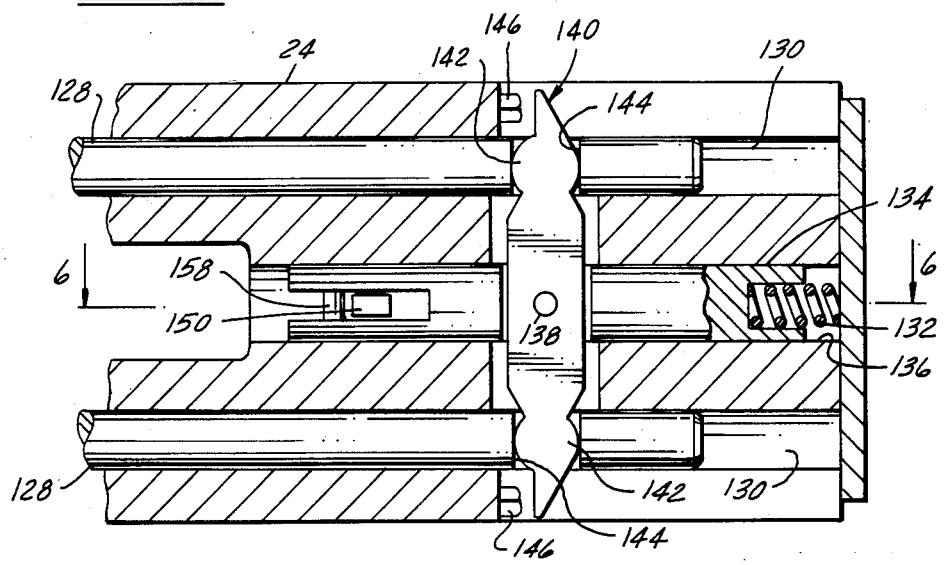
FIG. 5 is a fragmentary sectional view taken generally on line 5—5 of FIG. 2 showing an actuating mechanism for clamps of the apparatus carried by the machine.

As shown in FIGS. 2 and 3, in each work station the workpiece is also urged into and clamped against the end locator plate 22 by a pair of clamp pins 128 slideably received in a bore 130 in the frame of the machine. As shown in FIG. 5, each pair of clamp pins 128 is yieldably urged toward the stop plate 22 by a compression spring 132 received in a blind hole in an actuator shaft 134 slideably received in a bore 136 in the frame. The shaft is pivotally connected by a pin 138 to a transverse equalizing bar 140 with bearing portions 142 received in complementary slots 144 in the clamp pins. The extent to which the clamp pins can be advanced is limited by adjustable stop screws 146 secured to the frame. The equalizing bar 140 normally bears on these screws when there is no workpiece received in the station.

As a workpiece is inserted between the locators, it bears on the beveled faces 148 of the clamp pins and displaces them against the bias of the spring 132. This causes the clamp pins to urge the workpiece into engagement with the locator plate 22.

Figure 6:
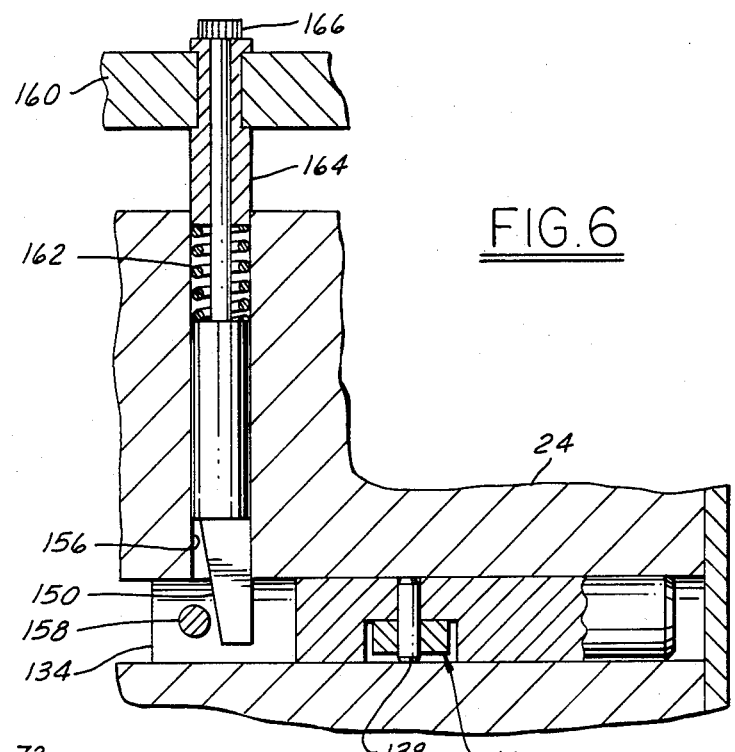
FIG. 6 is a fragmentary sectional view taken generally on line 6—6 of FIG. 5.

To resist the force produced by machining of the workpiece and to insure that it is firmly clamped against the locator plate 22, each pair of clamp pins 128 can be positively forced into engagement with the workpiece by a wedge 150 (FIGS. 5 and 6) actuated by a cylinder 152 (FIG. 1) mounted on a bracket 154 secured to the frame of the machine. Each wedge 150 is slideably received in a bore 156 in the frame and when advanced engages a follower pin 158 carried by the shaft 134. To insure the clamp pins 128 will be forced by the wedge into engagement with the workpieces regardless of variations in their width, each wedge is connected by a lost motion coupling to a common actuator plate 160. This coupling is provided by a compression spring 162 received in the bore between the wedge 150 and a plunger 164 slideably received in the bore and connected to the plate. To retain the plunger, spring and wedge in assembled relation, a cap screw 166 is slideably received in a bore through the plunger and threaded into the wedge.

The actuator plate 160 is secured to the piston rod 168 of the drive cylinder 150. When the piston rod is retracted all of the wedges are disengaged from their associated follower pins, and hence the actuator shaft 134. When the piston rod is advanced each wedge bears on its associated follower and forces its associated clamp pins into firm engagement with the workpiece received between the clamp pins and the associated stop plate 22.

When machining in the station has been completed, and the clamps 128 released, to insure that the workpiece will be removed from the locator and lowered with the pallet, each station has a stripper pad 170 (FIG. 2) slideably received in a bore 172 in the frame. All the stripper pads are actuated in unison by a hydraulic cylinder 174 mounted on a support bracket 176 secured to the frame. Each stripper pad is operatively connected to the cylinder by a stripper pin 178, fixed at one end to the pad and at the other end to a common actuator plate 180 connected to the piston rod 182 of the cylinder.

Figure 7:
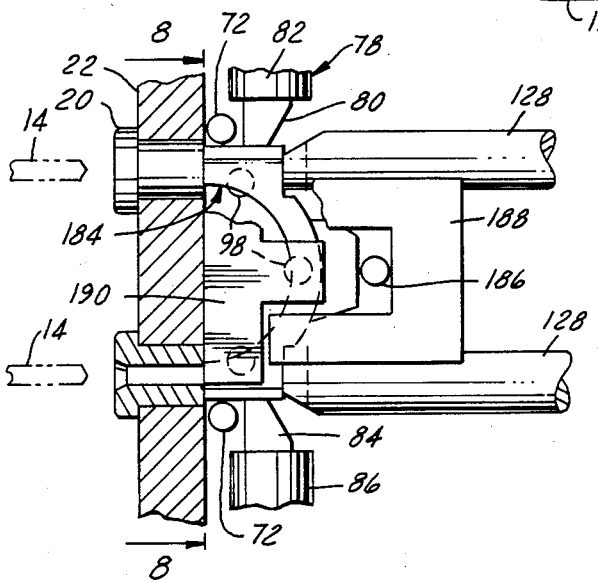
FIG. 7 is a fragmentary sectional view showing a modification of the apparatus to accommodate a different workpiece.
Figure 8:
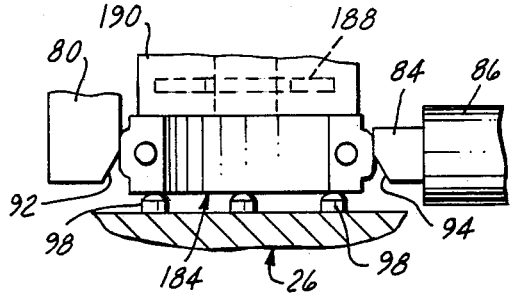
FIG. 8 is a fragmentary sectional view taken generally on line 8—8 of FIG. 7.

The gang machine 10 and apparatus 112 can be readily modified to accommodate a variety of workpieces. For example, as shown in FIGS. 7 and 8, they can be readily modified to machine holes in end caps 184 for connecting rods. To loosely retain an end cap on the pallet a third retainer pin 186 is mounted on the pallet and, if desired, the diamond shaped retainer 74 can be removed. To strip the end cap from the locators in the work station a forked or generally U-shaped stripper plate 188 is secured to the bottom of the stripper pad 170. To provide clearance for the stripper plate, the upper locator pad 76 is removed and replaced by a generally T-shaped locator pad 190 secured to the frame of the machine. With these modifications, end caps, rather than connecting rods, can be transferred, located, clamped and machined.

Figure 9:
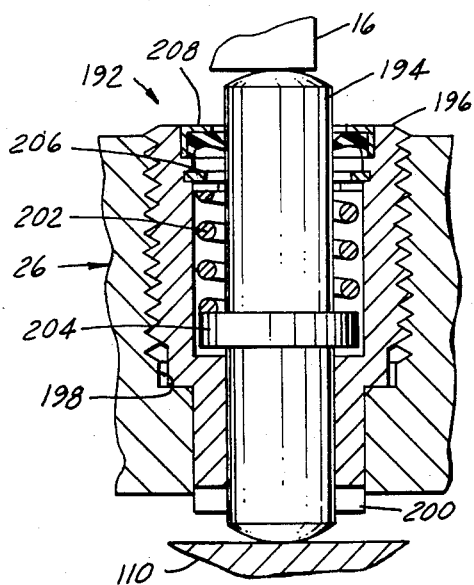
FIG. 9 is a fragmentary sectional view showing a modification of the clamps carried by the pallet of the apparatus.

To facilitate repair and replacement, if desired, readily removable clamp pins can be installed in the pallet in lieu of permanently mounting clamp pins 98 by elastic bushings 100 bonded to the pins and pallet. As shown in FIG. 9, removable clamp pin assemblies 192 can be installed in the pallets. Each assembly has a clamp pin 194 slideably received a in housing 196 screwed into a threaded counterbore 198 in the pallet. To facilitate insertion and removal of the assembly, an appropriate tool engaging slot 200 is provided in the bottom of the housing. The clamp pin is yieldably biased by a compression spring 202 received in the housing and trapped between a flange 204 on the pin and a snap-ring retainer 206 received in a groove in the housing. To prevent contaminants from entering the housing a seal 208 is pressed into a recess in the top of the housing and engages the pin.

In using the machine 10 and transfer and locator apparatus 12, a plurality of workpieces 16 or 184 to be machined are loaded onto each pallet 26 upstream of the machine. Each of the workpieces is loosely retained on the pallet by the retainers 72, 74 or 72, 186. Consequently, the workpieces can be and preferably are automatically loaded on the pallet by robots or other mechanical loading devices. With the pallet lift assembly 28 in its fully retracted position, the transfer rails 66 are advanced (to the right as shown in FIG. 1) to move the pallet with workpieces thereon into the machine 10 and any pallet already therein out of the machine. The pallet transferred into the machine is raised to the position shown in FIG. 2 by the lift assembly 28 which is actuated by energizing cylinder 42 which moves the actuator bar 38 to the left (as shown in FIG. 1).

As the pallet is raised it is positioned by the locator pins 68 which also provide a positive stop for the pallet when it is fully raised. As the pallet is raised each workpiece engages the beveled edges 90, 92, 94 and 148 of the locators and clamp pins 128 which shift it into alignment with the locators so that it is received between and engaes them. The workpiece is urged into engagement with the locators 22 and 78 by the yieldably biased finger 84 and clamp pins 128. After the pallet is fully raised, continued movement of the actuator bar 38 (as viewed in FIG. 1) advances all of the clamp pins 98 carried by the pallet to clamp each workpiece between its associated pins and upper locator pad 76 or 190. To positively clamp each workpiece against its associated locator plate 22, the clamp pins 128 are locked by energizing the cylinder 152. This advances the wedges 150 which engage the follower pins 158 to prevent the clamp pins 128 from being displaced by the force produced on the workpiece by machining it. This results in each workpiece being accurately located independently of both the other workpieces and the pallet.

In each station the drills 14 are rotated and advanced by a workhead (not shown) through the guide bushings 20 into the workpiece to drill holes in it. When the drilling is completed, the drills are retracted by the workhead. After drilling is completed the clamp pins are unlocked or released by energizing the cylinder 152 to retract the wedges 150 and disengage them from the follower pins 158. To insure that the workpieces will move downwardly with the pallet when it is lowered, the stripper pads 170 are advanced into engagement with the workpieces by energizing the cylinder 174. The clamping force on the clamp pins 98 is relieved and the pallet lowered by energizing the cylinder 42 to move the actuator bar 38 to the right as viewed in FIG. 1. As the pallet is initially lowered the workpieces are forced downwardly by the stripper pads 170 or plates 188 and disengage from all the locators and the clamp pins 128. As the lift is further lowered, the pallet is deposited on the transfer rails 66 and when fully lowered it clears the pallet. To transfer out of the machine the pallet with the machined workpieces on it, and into the machine another pallet with workpieces on it to be machined, the transfer rails are advanced or moved to the right as viewed in FIG. 1. The machine 10 and locator apparatus 12 are then ready to begin another cycle.

We claim:

1. For a machine in which substantially the same machining operation is performed on each of a plurality of workpieces at the same time, an apparatus for transferring and locating the workpieces comprising, at least one pallet constructed and arranged to receive and carry in spaced-apart relation a plurality of workpieces which are substantially the same, at least one retainer carried by the pallet for each workpiece received thereon, each said retainer being constructed and arranged to receive and permit a workpiece to be shifted within predetermined limits in at least two directions at a right angle to each other relative to the pallet, at least one locator for each workpiece carried by the pallet, each said locator being carried by the machine and constructed and arranged to accurately locate a workpiece in the machine independently of all other workpieces in the machine and the pallet so that a machining operation can be performed on each of the workpieces, a lift carried by the machine and constructed and arranged to move all the workpieces carried by the pallet to a first position wherein each workpiece engages at least one of said locators carried by the machine and to a second position spaced from said first position wherein all of such workpieces are disengaged from all of such associated locators and received on the pallet by their associated retainers carried by the pallet.

2. The apparatus of claim 1 which also comprises a transfer constructed and arranged to intermittently advance pallets through the machine.

3. The apparatus of claim 1 which also comprises at least one clamp pin associated with each workpiece and carried by said pallet, each said clamp pin being movable to an extended position to force its associated workpiece into firm clamping engagement with at least one of the associated locators carried by the machine and to a retracted position to release such clamping engagement, and at least one clamp drive carried by the machine, underlying a pallet when such pallet is received in the machine, and constructed and arranged when energized to move said clamp pins to their extended positions.

4. The apparatus of claim 3 which also comprises at least one clamp associated with each workpiece, carried by the machine, yieldably biased toward an associated locator and constructed and arranged to urge an associated workpiece when received between such locator and clamp into engagement with such locator.

5. The apparatus of claim 5 which also comprises releasable lock means operably associated with each said clamp carried by the machine and constructed and arranged to releasably lock each said clamp when a workpiece is received between such clamp and its associated locator.

6. The apparatus of claim 3 which also comprises bias means associated with each clamp pin and constructed and arranged to yieldably bias its associated clamp pin toward its retracted position.

7. The apparatus of claim 6 wherein said bias means comprises a spring.

8. The apparatus of claim 6 wherein said bias means comprises a body of yieldable plastic or rubber material with an elastic memory.

9. The apparatus of claim 1 wherein said lift is a pallet lift carried by the machine, underlying a pallet when received in the machine and constructed and arranged to move to a first position wherein it engages each workpiece carried by the pallet with at least one associated workpiece locator carried by the machine and to a second position in which all the workpieces are disengaged from all the locators carried by the machine and are received by retainers carried by the pallet.

10. The apparatus of claim 9 which also comprises a transfer constructed and arranged to advance intermittently a pallet into the machine, and said lift is constructed and arranged to have disengaged the pallet from the transfer when said lift is in its said first position, to deposit the pallet on the transfer as it moves toward its said second position and to be disengaged from the pallet when in its said second position.

11. The apparatus of claim 9 which also comprises at least one clamp pin associated with each workpiece and carried by said pallet, each said clamp pin being movable to a first position to force its associated workpiece into firm clamping engagement with at least one of the associated locators carried by the machine and to a second position to release such clamping engagement, and at least one clamp drive carried by the machine, underlying a pallet when such pallet is received in the machine, and constructed and arranged when energized to move said clamp pins to their first positions.

12. The apparatus of claim 11 which also comprises a transfer constructed and arranged to intermittently advance a pallet into the machine, and said lift is constructed and arranged to have disengaged the pallet from the tranfer when said lift is in its said first position, to deposit the pallet on the transfer as it moves toward its said second position and to be disengaged from the pallet when in its said second position.

13. The apparatus of claim 9 which also comprises at least one clamp associated with each workpiece, carried by the machine, yieldably biased toward an associated locator and constructed and arranged to urge an associated workpiece when received between such locator and clamp into engagement with such locator.

14. The apparatus of claim 13 which also comprises releasable lock means operably associated with each clamp carried by the machine and constructed and arranged to releasably lock each said clamp when a workpiece is received between such clamp and its associated locator.

* * * * *